(12) United States Patent
Groom et al.

(10) Patent No.: US 6,472,856 B2
(45) Date of Patent: Oct. 29, 2002

(54) BOUNDED POWER SUPPLY VOLTAGE POSITIONING

(75) Inventors: Terry J. Groom, Durham, NC (US); Stuart Pullen, Raleigh, NC (US)

(73) Assignee: Semtech Corporation, Morrisville, NC (US)

( * ) Notice: Subject to any disclaimer, the term of this patent is extended or adjusted under 35 U.S.C. 154(b) by 69 days.

(21) Appl. No.: 09/803,689

(22) Filed: Mar. 9, 2001

(65) Prior Publication Data

US 2002/0125871 A1 Sep. 12, 2002

(51) Int. Cl.[7] .................................................. G05F 1/40
(52) U.S. Cl. ...................................................... 323/284
(58) Field of Search ................................. 323/222, 282, 323/284, 285, 908

(56) References Cited

U.S. PATENT DOCUMENTS 5,982,160 A * 11/1999 Walters et al. .............. 323/282
6,127,814 A * 10/2000 Goder ......................... 323/282
6,278,265 B1 * 8/2001 Yokosawa .................... 323/282

* cited by examiner

*Primary Examiner*—Jessica Han
(74) *Attorney, Agent, or Firm*—Coats & Bennett, P.L.L.C (57) ABSTRACT

A voltage positioning technique allows a power supply controller to more fully exploit active voltage positioning as a way of maintaining supply voltage within the limits defined for an associated electrical load. The supply voltage is allowed to "droop" as a function of load current. Droop may be implemented in linear proportion to load current, or as a discrete droop function once load current exceeds a given threshold. In either case, the droop circuitry of the supply controller implements a bounding function that establishes an accurately known maximum droop voltage magnitude. This maximum droop voltage limit establishes a reliable lower limit for the supply voltage independent of increasing load current. This accurately set lower bound for the droop voltage enables the controller to more aggressively position the supply voltage at the lower voltage limit of the load, which minimizes voltage overshoot and load power consumption.

43 Claims, 11 Drawing Sheets

BOUNDED POWER SUPPLY VOLTAGE POSITIONING

BACKGROUND OF THE INVENTION

The present invention generally relates to electrical power supplies, and particularly relates to output voltage positioning control.

Electronic devices of all types are an integral part of everyday life. While the purposes served by these devices is widely varied, from cell phones to GPS receivers, to portable or desktop computers, the devices themselves have several characteristics in common. For example, with the increasing sophistication of the average consumer and the competitive market pressure attendant with that sophistication, the capabilities and features of modern electronics advances at a relentless pace. Advances in device capability or speed generally arise from building in more powerful computational systems at the core of these electronic devices.

At the heart of these computational cores are advanced microprocessors or other digital logic devices. In tracing the pace of development for digital electronics, one sees an almost stunning rate of increase in device complexity and sophistication. Modern microprocessors, as well as other types of advanced devices like field programmable gate arrays (FPGAs) and application specific integrated circuits (ASICs), may include tens of millions of transistor devices and operate at clock speeds well over 1 GHz. Both electrical and economic constraints limit the size of high-performance integrated circuits, and so chip designers continually shrink the basic geometries of the semiconductor devices or elements comprising these large integrated circuits.

With shrinking geometries come advantages in physical packaging and lower operating voltages. The lower operating voltages permit higher clock speeds because of reduced signal swing and substantial savings in operating power. For example, a few short years ago, digital logic, including many microprocessors, commonly operated at 5 VDC, while it is not uncommon today for advanced microprocessors to operate at 1.25 VDC or lower. Even at these greatly reduced operating voltages, these modern digital circuits require significant operating current. Indeed, maximum current draw for high-end microprocessors may be in excess of fifty amps. Moreover, the instantaneous current requirement for such devices may change suddenly, such as when going from an idle state to a full active condition.

Powering these types of electronic loads is a multi-faceted challenge. Typically, such electronics have tight operating voltage specifications, meaning that the supply voltage provided to them is allowed to vary only slightly across the full range of device operating conditions. Meeting these tight supply voltage limits is exacerbated by the large dynamic range of required load current, and particularly by the rapid rate of change of required load current.

BRIEF SUMMARY OF THE INVENTION

An apparatus and method provide bounded voltage droop, which facilitates active voltage positioning in power supply applications. A bounded droop circuit generates a droop voltage based on load current, such that the output voltage provided to the load by an associated power supply drops below its nominal value by an amount determined by the droop voltage. The droop circuit includes a droop limiter that establishes a maximum droop voltage that is independent of load current, thereby preventing the output voltage from dropping below a minimum operating voltage of the load.

Because the droop limiting function establishes an accurate maximum droop voltage, the bounding limit may be set substantially at the lower operating limit of the load, thereby allowing the power supply to take full advantage of the load's operating voltage range. Drooping to the minimum operating voltage can save operating power and minimizes any voltage overshoot at the load arising from sudden reductions in load current.

The bounded droop circuit may be implemented such that it provides a discrete droop voltage, or provides a droop voltage that is linearly proportional to the load current up to the bounding point. In either case, the bounding point establishes the maximum droop voltage and corresponding minimum output voltage. The bounded droop circuit may be incorporated into a power supply controller, such as a switch-mode controller. If integrated into a larger power supply controller, the operating limits, such as the maximum allowable droop voltage, may be set via external components. This allows significant flexibility from the perspective of system designers.

DETAILED DESCRIPTION OF THE INVENTION

Figure 1:
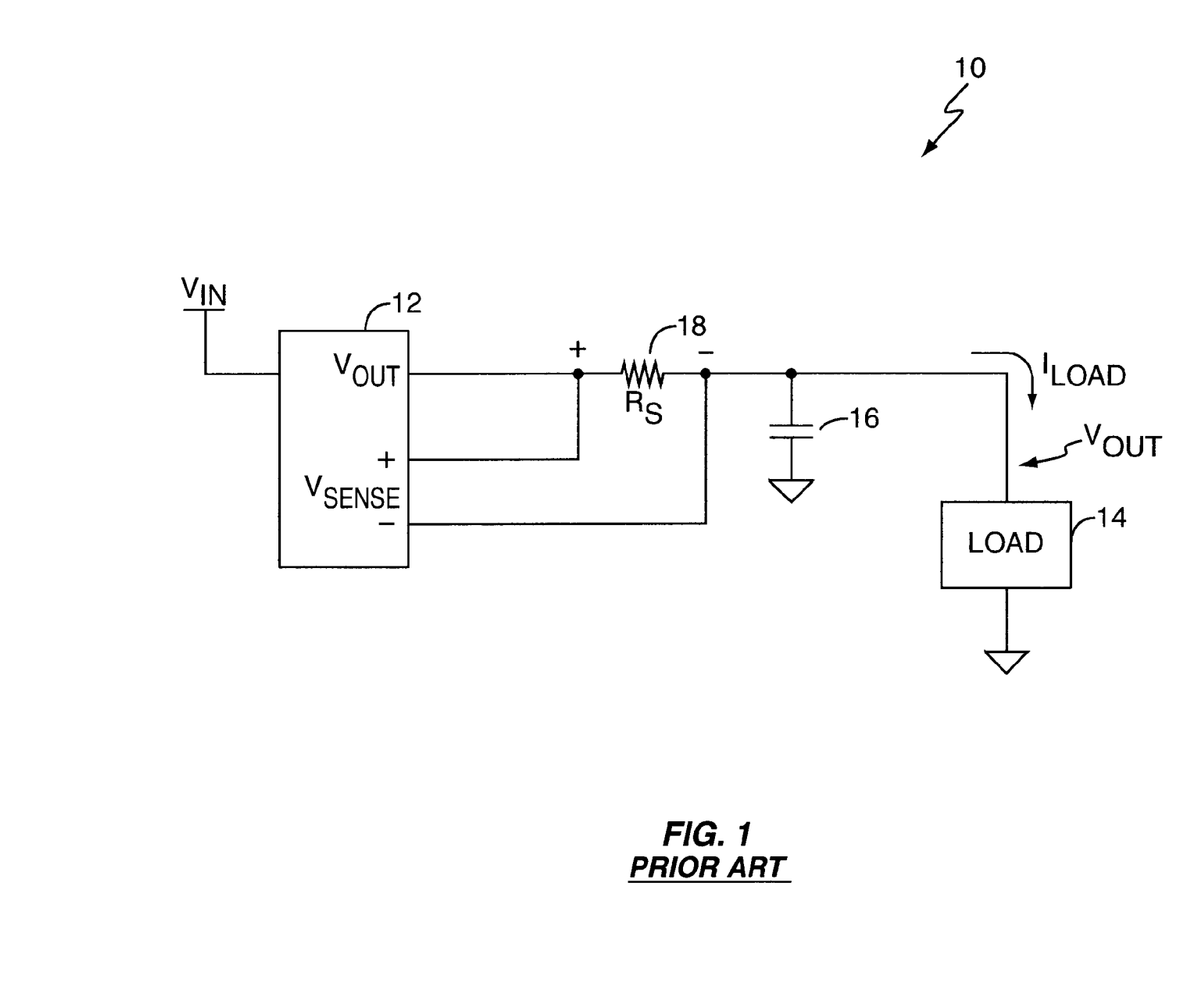
FIG. 1 is a diagram of a typical power supply that implements conventional unbounded voltage droop.

FIG. 1 is a diagram of a typical electrical circuit 10 comprising a power supply 12 providing a regulated voltage signal $V_{OUT}$ to a load 14. One or more output capacitors 16 sit in parallel with the load 14 and provide it with input filtering and local charge storage. The supply 12 sources load current through a sense resistor 18 that provides a differential voltage $V_{SENSE}$ proportional to load current. The supply 12 uses the sense voltage $V_{SENSE}$ to implement active voltage positioning for the load 14 for purposes explained below.

The load 14 may, for example, be a microprocessor or other logic circuit that requires the supply 12 to respond to fast changes in required load current $I_{LOAD}$. A typical step-change in load current $I_{OUT}$ for a microprocessor-based load 14 might be an increase from less than half an Amp to more than twenty Amps in less than a hundred microseconds. Conversely, a microprocessor-based load 14 might rapidly change from drawing maximum load current to essentially no load current, for example when it changes from a state of maximum activity to an idle state. Both positive and negative step-changes in load current $I_{LOAD}$ pose regulation challenges to the supply 12.

Figure 2:
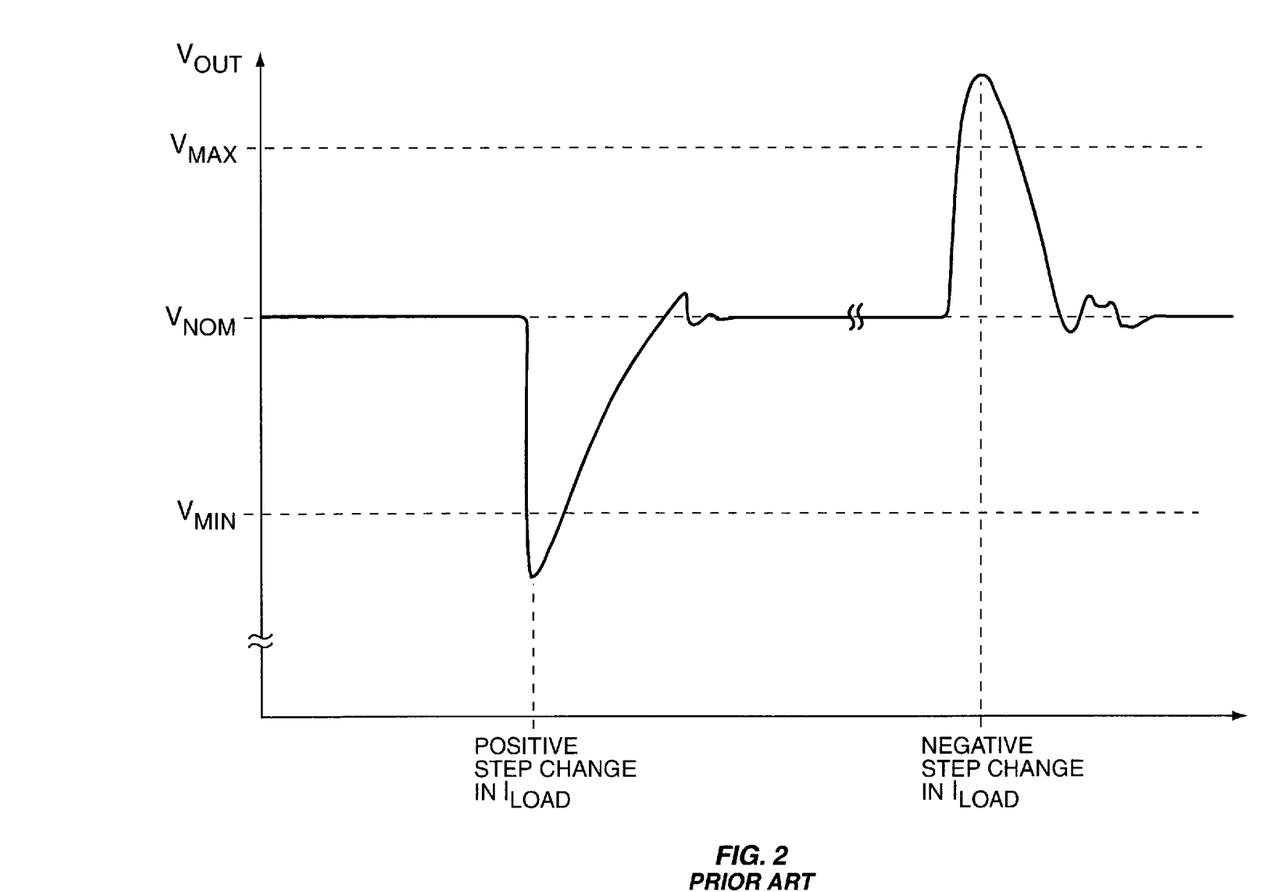
FIG. 2 is a diagram of a regulated voltage output under transient load current conditions.

FIG. 2 better illustrates the challenges of tightly regulating a dynamic load 14. Typically, the load 14 is specified for operation at a nominal operating voltage $V_{NOM}$, with upper and lower operating voltage limits $V_{MAX}$ and $V_{MIN}$, respectively. As shown, a step-change increase in load current $I_{LOAD}$ may cause the regulated output voltage $V_{OUT}$ from the supply 12 to drop below the minimum operating limit $V_{MIN}$. Generally, this momentary voltage drop arises because the rate-of-change in $I_{LOAD}$ exceeds the bandwidth of the supply's control loop and the output capacitor 16 is unable to fully compensate for the instantaneous increase in load current.

Similarly, a sudden change from full load current to light load current may cause the regulated output voltage $V_{OUT}$ to momentarily rise above the upper operating voltage limit $V_{MAX}$. Excursions either above $V_{MAX}$ or below $V_{MIN}$ may cause unreliable operation of the load 14. For example, if the load 14 is a microprocessor in a computer system, these violations of operating voltage limits may shut down the computer system, or cause its operation to be unreliable.

Figure 3:
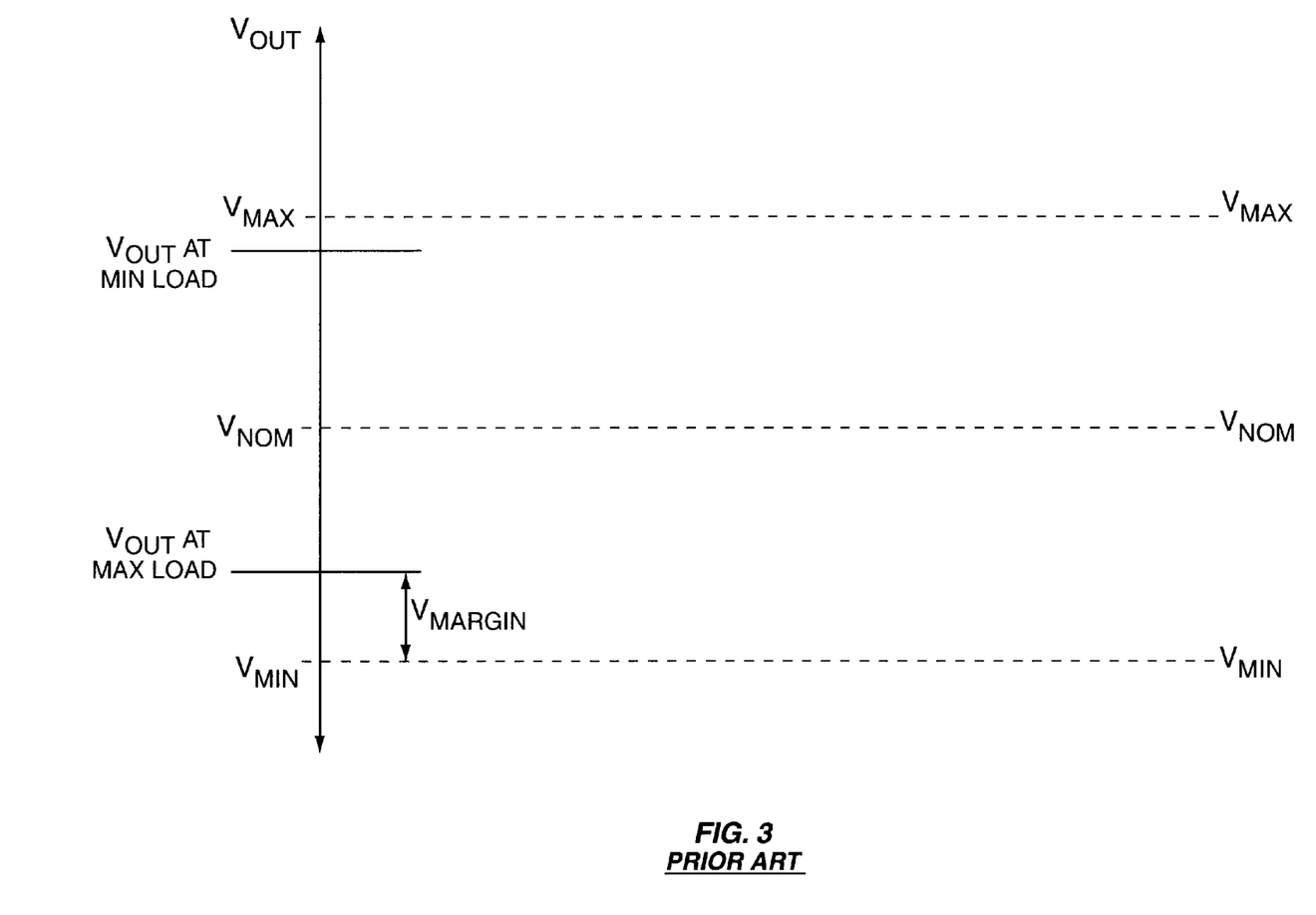
FIG. 3 is a diagram of a conventional approach to active voltage positioning of the output voltage from a power supply.

FIG. 3 diagrams a typical approach to active voltage positioning. The technique attempts to prevent or greatly minimize operating voltage violations by positioning the level of the regulated output voltage $V_{OUT}$ based on the operating condition of the load 14. For example, some active voltage positioning approaches set $V_{OUT}$ slightly above $V_{NOM}$, moving it closer to $V_{MAX}$, when the load current $I_{LOAD}$ is relatively small or zero so that a step-change increase in $I_{LOAD}$ is less likely to pull the output voltage $V_{OUT}$ down below the minimum level $V_{MIN}$. Holding $V_{OUT}$ near $V_{MAX}$ at light loads prevents the essentially unavoidable momentary dip in $V_{OUT}$ associated with rapidly transitioning to at or near maximum load current from dropping below the lower operating voltage limit $V_{MIN}$.

A similar approach may be adopted to prevent over voltage conditions on $V_{OUT}$ when load current step-changes from a high value to a low value. At high load current conditions, the supply 12 sets $V_{OUT}$ to a value below $V_{NOM}$, but above $V_{MIN}$. Thus, if the load current is suddenly relieved, the momentary rise in $V_{OUT}$ remains below the maximum operating voltage $V_{MAX}$. Setting the regulated output voltage $V_{OUT}$ below $V_{NOM}$ at high load currents is known as "drooping" the output voltage. Note that in typical implementations of the power supply 12, the maximum amount that $V_{OUT}$ is allowed to droop is configured for known maximum current conditions and set well above the minimum operating voltage of the load 14. The difference between the $V_{OUT}$ at maximum droop versus the minimum operating voltage $V_{MIN}$ may be referred to as $V_{MARGIN}$.

Ideally, the supply 12 would, at maximum load current, droop its output voltage $V_{OUT}$ all the way down to the minimum operating voltage $V_{MIN}$. Operating at $V_{MIN}$ provides the maximum dynamic range ($V_{MAX}-V_{MIN}$) for positive excursions in $V_{OUT}$, thereby increasing the likelihood that any increase in $V_{OUT}$ due to a sudden decrease in load current remains below $V_{MAX}$.

Figure 4:
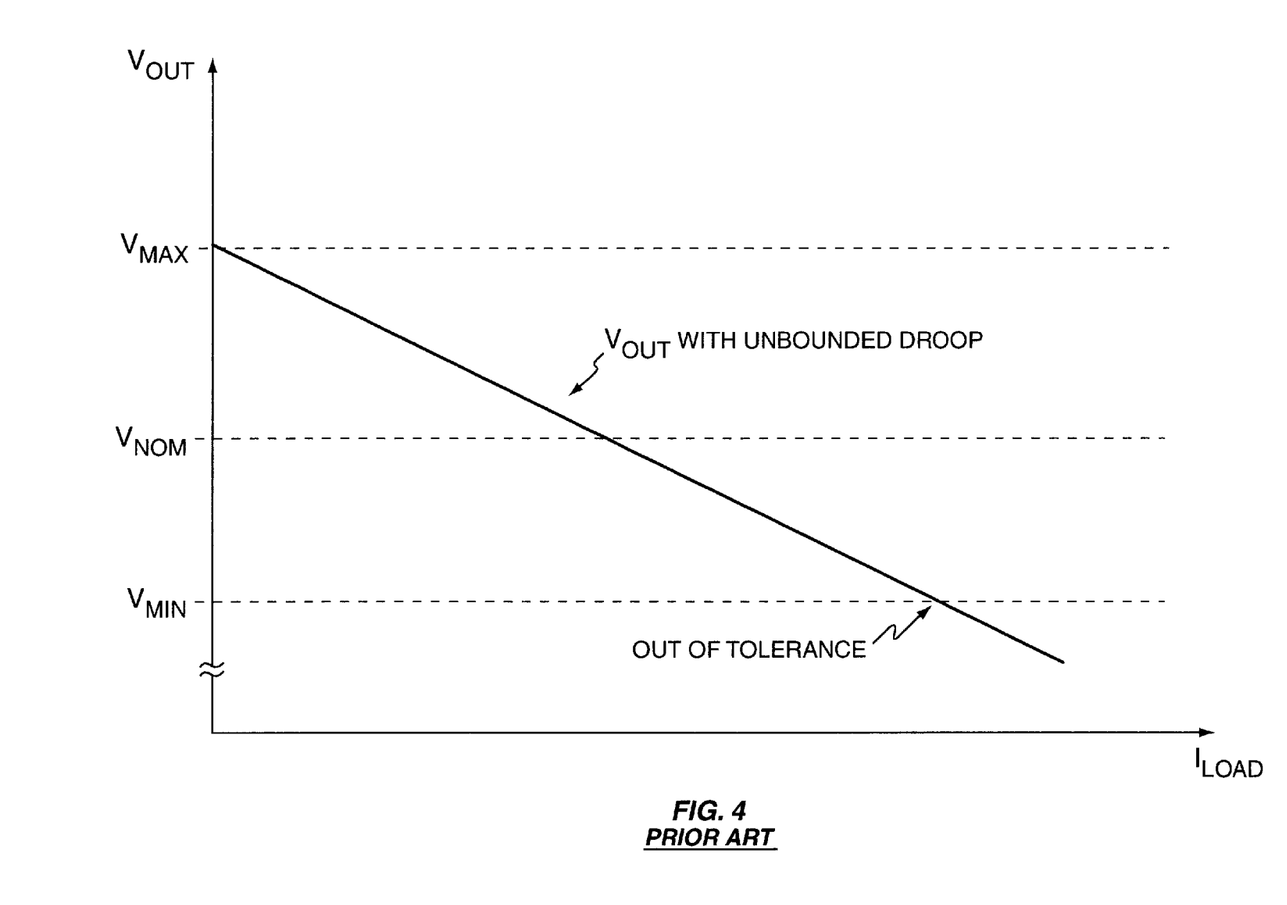
FIG. 4 is a diagram of a conventional proportional unbounded droop voltage implementation.

FIG. 4 is a diagram of typical voltage drooping operation consistent with the power supply 12 of FIG. 1, and provides a basis for discussing difficulties associated with achieving the above ideal. From FIG. 1, the supply 12 includes feedback inputs for measuring a differential voltage $V_{SENSE}$ across a sense resistor 18 placed in series in the load current path. As the load current $I_{LOAD}$ increases, $V_{SENSE}$ increases. By using $V_{SENSE}$ to set the output voltage $V_{OUT}$, the supply 12 can cause $V_{OUT}$ to droop in proportion to load current $I_{LOAD}$. As is shown, increasing load current $I_{LOAD}$ eventually cause the output voltage $V_{OUT}$ to fall below the minimum operating voltage $V_{MIN}$.

System designers adopt a variety of techniques to avoid the above situation. As noted in FIG. 3, a designer might perform a worst-case analysis involving maximum possible load current for the load 14, component tolerances for the sense resistor 18, as well as the measurement accuracy of the supply 12 associated with its $V_{SENSE}$ feedback circuits. On top of this, the designer might include the basic regulation accuracy of the supply 12, and potentially numerous other sources of error. The net result is that a system designer often must build in a significant voltage margin, resulting in a $V_{OUT}$ that remains well above $V_{MIN}$, even at maximum load currents. While this avoids drooping $V_{OUT}$ below $V_{MIN}$, it sacrifices dynamic range and tends to prevent positive-going spikes in $V_{OUT}$ from exceeding $V_{MAX}$.

Of greater significance with regard to overall system performance, the need to build in significant voltage margin compromises efficiency. By operating significantly above the minimum voltage $V_{MIN}$ even at maximum loads, power consumption remains higher than optimal. Because load power varies as a square of the output voltage $V_{OUT}$, lowering $V_{OUT}$ substantially to the minimum operating voltage $VM_{IN}$ yields potentially significant power savings.

Figure 5:
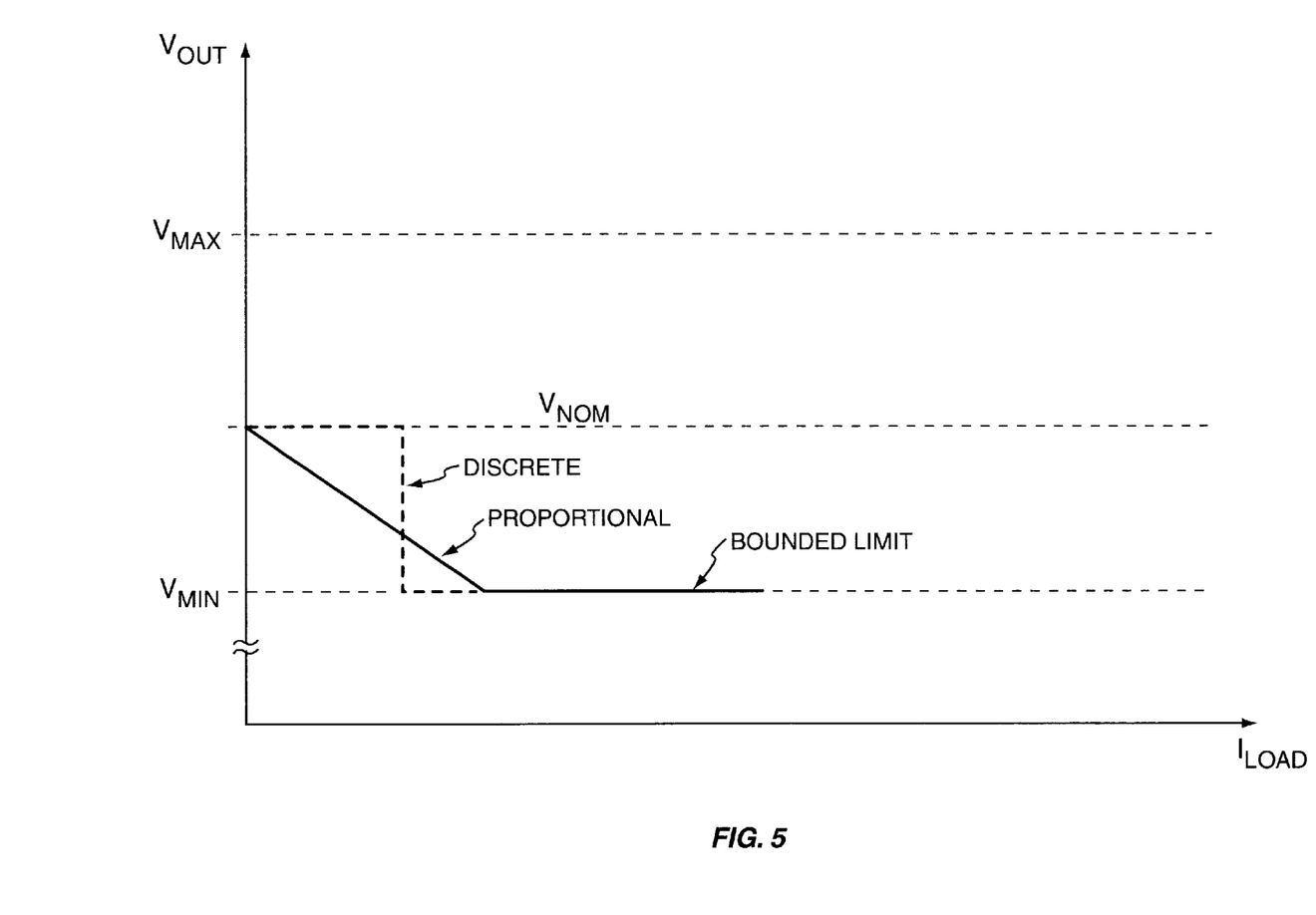
FIG. 5 is a diagram of proportional and discrete bounded droop voltage in accordance with the present invention.

FIG. 5 is a diagram of voltage positioning in accordance with the present invention. The output voltage $V_{OUT}$ is permitted to droop down to $V_{MIN}$, or at least very close to $V_{MIN}$, but not allowed to droop below $V_{MIN}$. This technique is referred to as "bounded" droop, in that the present invention imposes a well-controlled lower limit on $V_{OUT}$ by accurately bounding the maximum droop voltage. While $V_{OUT}$ is shown drooping from the $V_{NOM}$ level with increasing load current $I_{LOAD}$, the present technique permits $V_{OUT}$ to start from any point within a given operating voltage range for a given load 14. For example, $V_{OUT}$ may be set to start at a point closer to or substantially at $V_{MAX}$ and then droop downward from there.

Also note that two waveforms are depicted for $V_{OUT}$. The first, a ramping waveform, represents a proportional approach to drooping $V_{OUT}$, where $V_{OUT}$ linearly droops with increasing load current $I_{LOAD}$ up to the bounding point, where $V_{OUT}$ maintains a fixed lower limit regardless of further increases in load current $I_{LOAD}$ The second waveform—shown as a dashed line—depicts a discrete implementation of bounded droop.

With discrete voltage drooping, the output voltage $V_{OUT}$ maintains a first value, $V_{NOM}$ for example, until the load current $I_{LOAD}$ reaches a defined threshold at which point $V_{OUT}$ drops to its lower bounding limit. As with the proportional approach, $V_{OUT}$ in the discrete bounding approach remains at its lower bounding limit regardless of further increases in load current.

By accurately positioning the output voltage $V_{OUT}$ at a bounded lower limit that may be set substantially to the minimum operating voltage of the load 14 ($V_{MIN}$), the present invention allows a system to draw less power on average. This yields improvements in overall system efficiency and more effectively prevents operating voltage violations at the load 14.

Figure 6:
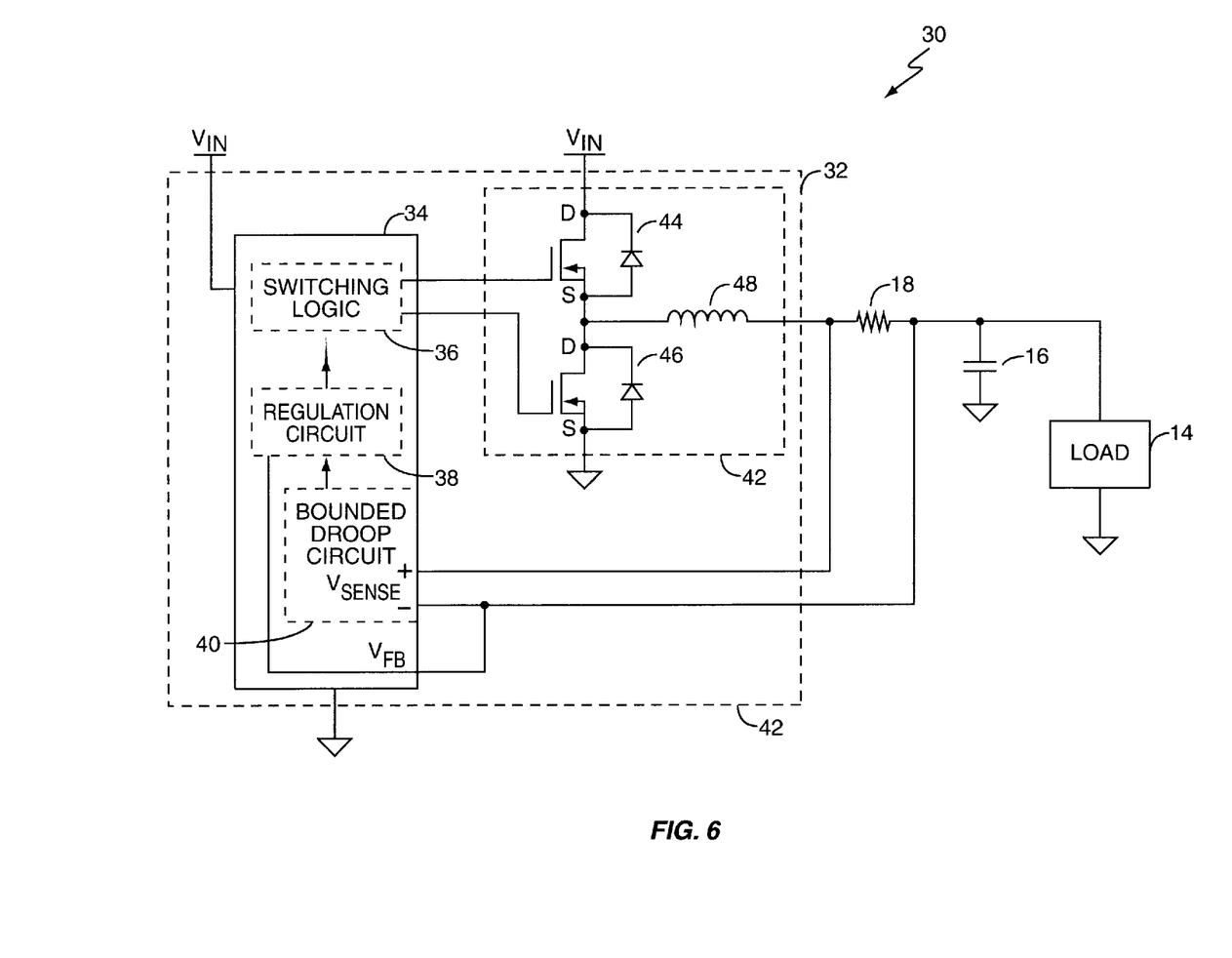
FIG. 6 is a diagram of an exemplary power supply incorporating bounded voltage droop.

FIG. 6 is a diagram of an electrical circuit 30 that comprises a power supply 32, sense resistor 18, output capacitor 16, and the load 14. The supply 32 comprises a supply controller 34 in accordance with an exemplary embodiment of the present invention. The controller 34 includes switching logic 36, a regulation circuit 38, and a bounded droop circuit 40. The switching circuit 36 and the regulation circuit 38 may be thought of as together forming a regulation control circuit to regulate the output voltage $V_{OUT}$ based on a feedback signal provided by the bounded droop circuit 40.

The supply 32 is shown as a single-phase, synchronous buck switch-mode power supply but the present invention may be adapted to other switch-mode configurations and, indeed, other types of power supplies.

In operation, the controller 34 maintains a regulated output voltage $V_{OUT}$ at the load 14 by controlling the switching circuit 42. The switching circuit 42 comprises a high-side switch 44, a low-side switch 46, and an inductor 48. The switches 44 and 46 may be implemented as field-effect transistor (FET) switches, and may or may not include a diode across their source (S) and drain (D). Often, FET switches include an integral, so-called "body" diode as part of their internal structure. In any case, to increase $V_{OUT}$, the controller 34 turns high-side switch 44 on, while holding low-side switch 46 off. The controller 34 then turns switch 44 off and turns switch 46 on. As is well understood, the controller 34 maintains $V_{OUT}$ at a desired level by rapidly repeating these switching actions.

The output capacitor 18 acts as a filter, smoothing the output voltage $V_{OUT}$, and acts as a local, low-impedance reservoir of charge that helps to minimize dips and spikes in $V_{OUT}$ associated with transients in load current $I_{LOAD}$. The current through the inductor 48 ramps up and down because of the switching actions of the high- and low-side switches 44 and 46. Practically, the output capacitor 16 is not a perfect capacitor in that it includes some series resistance, which is termed its equivalent series resistance, or ESR. The up and down ramping of the inductor current causes ripple in the output voltage $V_{OUT}$ due to the ESR of the capacitor 16.

The controller 34 uses some form of feedback that is associated with or derived from the regulated output voltage $V_{OUT}$. The regulation circuit 38 uses the feedback signal to control the switching logic 34 to maintain the desired value for $V_{OUT}$. It should be understood that feedback could be taken in many forms, such as voltage-mode or current-mode. The illustration and accompanying discussion contemplate feeding back the output voltage signal $V_{OUT}$, or some portion thereof, and basing regulation control on voltage ripple in the feedback signal. The bounded droop techniques of the present invention are adaptable to other regulation techniques.

Figure 7:
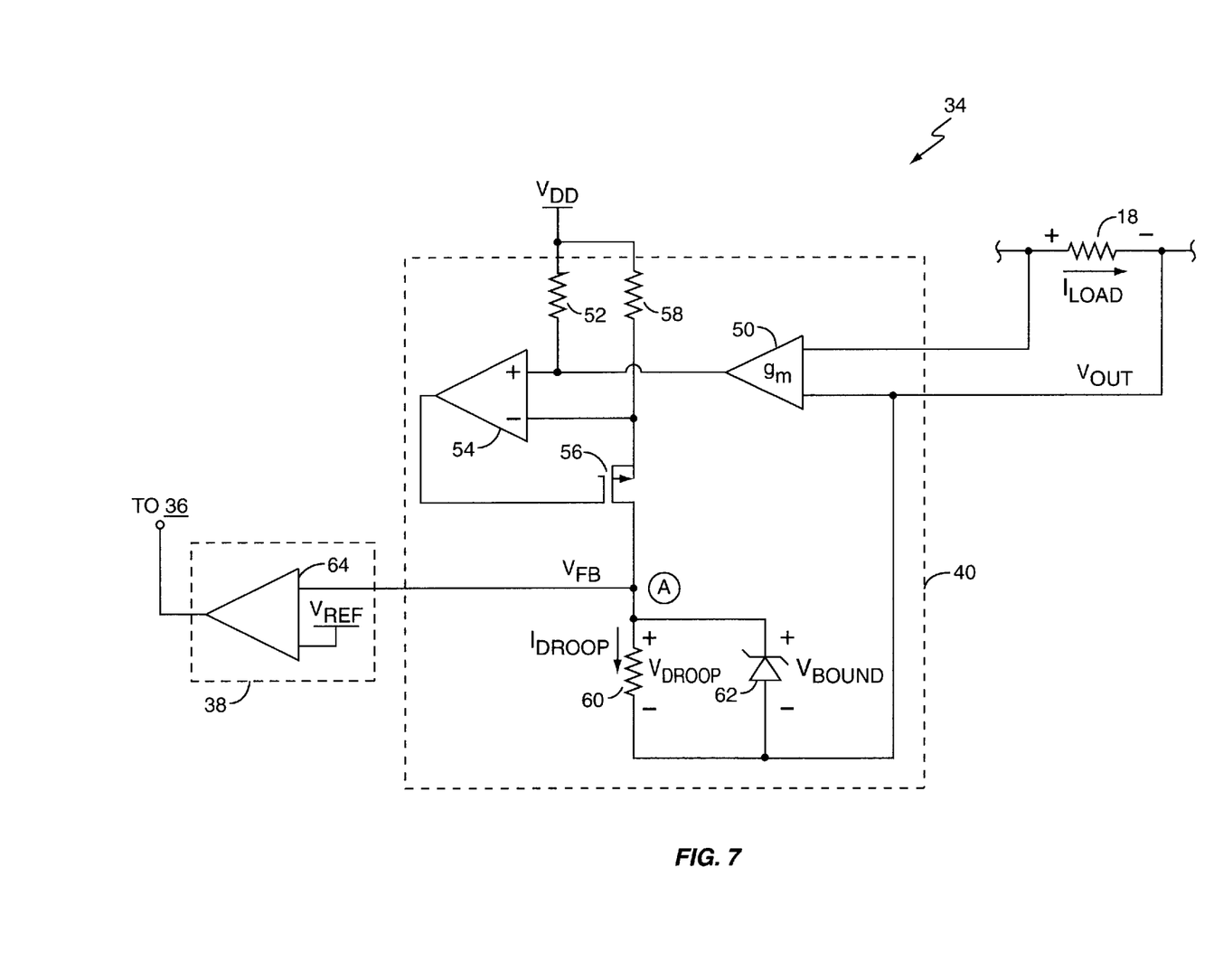
FIG. 7 is a diagram of an exemplary bounded proportional voltage droop circuit.

FIG. 7 is a diagram of exemplary implementations of the regulation circuit 38 and the bounded droop circuit 40. The regulation comparator 38 comprises a comparator 64, used to compare a feedback voltage with a reference signal $V_{REF}$. The value of $V_{REF}$ sets the level of $V_{OUT}$, ignoring for a moment any effects of the bounded droop circuit 40. The controller 34 typically includes a reference voltage generator (not shown) for creating $V_{REF}$ internally, although the controller 34 may provide one or more external connections allowing $V_{REF}$ to be adjusted, or supplied by an external source.

The regulation comparator 64 asserts its output signal when the feedback signal $V_{FB}$ falls below $V_{REF}$. This causes the switching logic to switch the switching circuit 42 high by turning on the high-side switch 44 and turning off the low-side switch 46, thereby connecting the inductor 48 to the supply voltage $V_{IN}$ and causing $V_{OUT}$ to begin rising. The feedback signal $V_{FB}$ rises with $V_{OUT}$, and eventually moves back above the $V_{REF}$ threshold, causing the regulation comparator 64 to de-assert its output signal. The switching logic 36 then switches the switching circuit 42 low by turning off the high-side switch 44 and turning on the low-side switch 46.

In this implementation, the switching logic 36 typically includes output pulse generators to generate fixed on-time switching pulses for the high- and low-side switches 44 and 46. That is, each time the regulation comparator 64 asserts its output, the switching logic switches the switching circuit 42 high for a predetermined length of time. An alternative to this constant on-time approach to ripple-mode control is termed hysteretic control.

Hysteretic control replaces the single regulation comparator 64 with a pair of regulation comparators (not shown). An upper threshold comparator in the regulation circuit 38 asserts its output when the feedback signal $V_{FB}$ exceeds $V_{REF}$ by a defined upper threshold, and a lower threshold comparator asserts its output when the feedback signal $V_{FB}$ falls below $V_{REF}$ by a defined lower threshold. With hysteretic control, the switching logic 36 switches the switching circuit 42 high when the lower threshold comparator is asserted, and switches the switching circuit 42 low when the upper threshold comparator is asserted. Both constant on-time and hysteretic control provide excellent transient response because of the high bandwidth of the feedback loop. That is, the feedback loop essentially includes just the high-speed comparator 64 (or comparators).

Note also that, in the context of discussing the regulation circuit 38, FIG. 7 depicts an exemplary comparator arrangement suitable for use with, for example, a constant on-time regulation. It should be understood that the regulation circuit 38 can be any type of regulation circuit adapted to compare some form of feedback from the regulated output with some reference signal. Thus, the regulation circuit 38 may be, for example, a voltage- or current-mode error amplifier. The bounded droop circuit 40 is compatible with a variety of regulation circuits 38.

The bounded droop circuit 40 includes, in this embodiment, a transconductance amplifier 50 and associated resistor 52, a closed-loop amplifier circuit, and a droop limiting circuit comprising a resistor 60 and a diode 62. The closed-loop amplifier circuit functions as a current source providing $I_{DROOP}$ and comprises an amplifier 52, a pass transistor 56, and a resistor 58.

In operation, the load current $I_{LOAD}$ generates a differential voltage across the sense resistor 18. The transconductance amplifier 50 converts this differential voltage into a proportional current, with the proportional current sourced through the resistor 52 from a supply voltage $V_{DD}$. $V_{DD}$ may be derived from $V_{IN}$ or supplied externally. The amplifier 54, typically implemented as an operational amplifier, works to null the voltage difference at its inverting (−) and non-inverting (+) input terminals by controlling the gate bias on the pass transistor 56 such that it conducts enough current to generate the same voltage drop across the resistor 58 as is across the resistor 52. The value of the resistor 58 with respect to the resistor 52 sets the "gain" of the bounded droop circuit 40. Preferably, the resistor 58 is external to the controller 34 so that gain may be adjusted as needed in a given design.

The current sourced from $V_{DD}$ through the resistor 58 and the pass transistor 56 is termed the droop current $I_{DROOP}$, and flows into the droop limiting circuit formed by the droop resistor 60 and the clamp diode 62. Note that the opposite end of the droop resistor 60 is tied to the output voltage $V_{OUT}$, so that $I_{DROOP}$ causes the feedback voltage $V_{FB}$ to rise above the actual output voltage $V_{OUT}$ by the value of $V_{DROOP}$. The droop voltage $V_{DROOP}$ is given as, $$V_{DROOP} = I_{DROOP} \times R60.$$

Where $I_{DROOP}$ is in Amps and the droop resistor 60 is in Ohms. So, as the load current $I_{LOAD}$ increases, the feedback voltage $V_{FB}$ into the regulation comparator 64 increases due to the increasing droop voltage $V_{DROOP}$. This causes the regulation comparator 64 to regulate $V_{OUT}$ to a value lower than it otherwise would by an amount equal or at least proportional to $V_{DROOP}$. That is, if $V_{REF}$ represents the desired level for $V_{OUT}$, the controller 34 would regulate $V_{OUT}$ as, $$V_{OUT} \cong V_{REF} - V_{DROOP}.$$

The above expression for $V_{OUT}$ holds so long as the voltage generated across the droop resistor 60 ($V_{DROOP}$) remains below the clamping voltage of the clamp diode 62. The clamp diode 62 may be implemented as a precision Zener diode, a 1% tolerance Zener for example, with a relatively low and precisely known clamp voltage.

Preferably, the droop resistor 60 is external to the controller 34 so that the desired maximum droop voltage is set in accordance to the needs of a given circuit implementation. With the resistors 58 and 60 external to the controller, a designer has the freedom to tailor the drooping characteristics of the controller 34 to the needs of the specific design.

The above implementation may have several drawbacks in that the use of the clamping diode 62 introduces one or more error terms that may compromise the accuracy with regard to setting the absolute maximum droop voltage. For example, the clamp voltage of the clamp diode 62 may have significant temperature dependence, or may not have a sufficiently tight initial voltage tolerance. Uncertainty in clamping voltage may force designers to back off from setting $V_{DROOP}$ as aggressively as they otherwise might.

Figure 8:
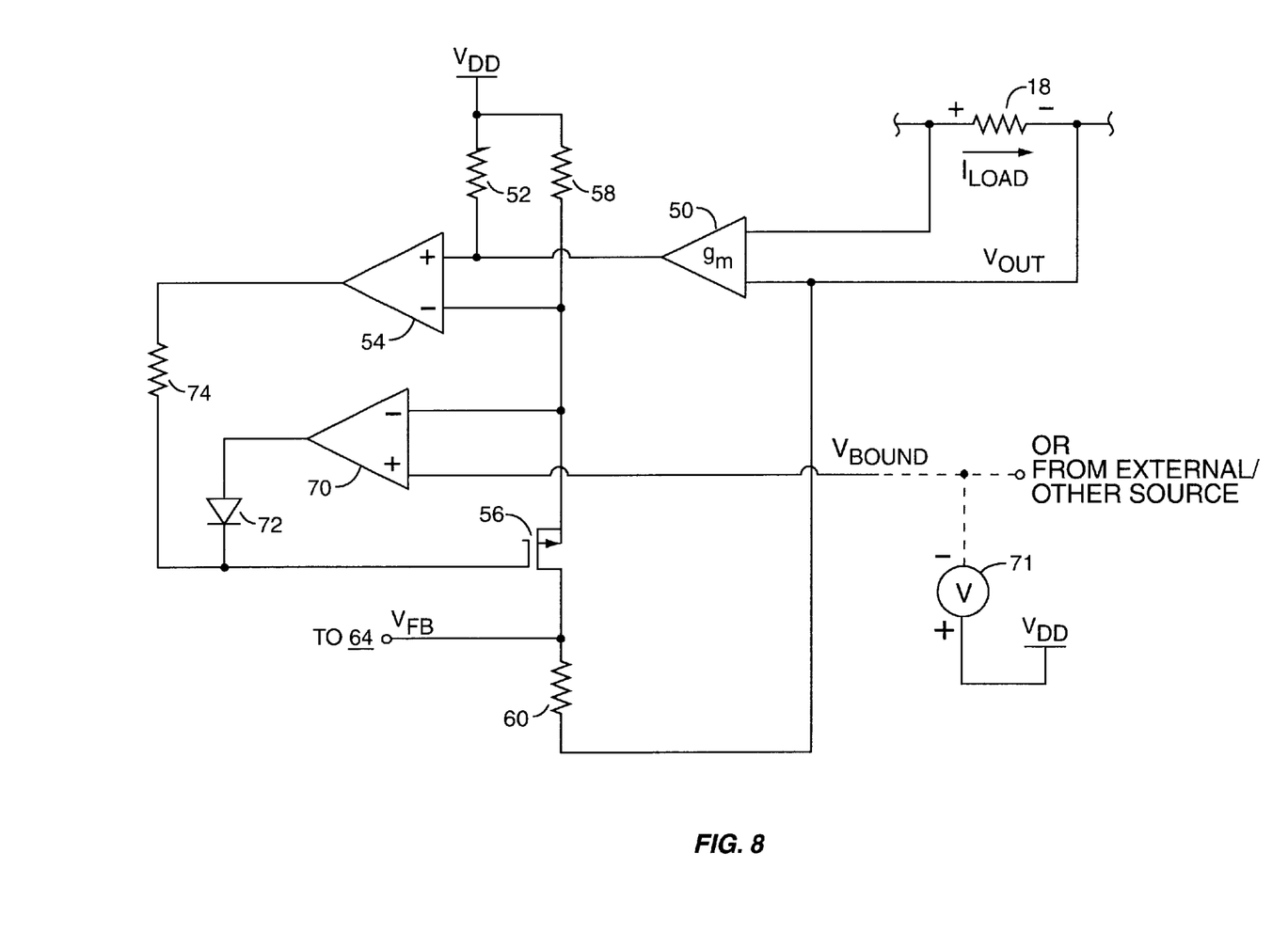
FIG. 8 is a diagram of an alternate exemplary bounded proportional voltage droop circuit.

FIG. 8 is a diagram of an exemplary circuit for establishing a very accurate maximum bound for $V_{DROOP}$ and involves the feedback loop of the operational amplifier 54. The bounding circuitry comprises an additional closed-loop amplifier 70 and associated diode 72. A bounding voltage $V_{BOUND}$ serves as a reference for the amplifier 70. The other input terminal of the amplifier 70 is tied to the bottom of the resistor 58 and so receives a voltage determined by voltage drop across the resistor 58, which may be expressed as, $$VR58 = I_{DROOP} \times R58.$$

Where IDROP is in Amps, and R58 is in Ohms. If VR58 is below $V_{BOUND}$, the amplifier 70 keeps its output low, holding the diode 72 in a reversed biased condition and does not interfere the gate bias voltage generated by the amplifier 54. However, when the difference between $V_{DD}$ and VR58 exceeds the difference between $V_{DD}$ and $V_{BOUND}$, the amplifier 70 increases its output voltage to point where the diode 72 begins to be forward biased.

This action begins to raise the bias voltage applied to the pass transistor 56, which increases it resistance and reduces $I_{DROOP}$ The feedback control operation of the amplifier 70 limits the droop current $I_{DROOP}$ to a precisely controlled maximum value. This in turn establishes an accurately limited maximum droop voltage generated across the resistor 60.

The bounding voltage $V_{BOUND}$ may be generated internal or external to the controller 34 with essentially arbitrary accuracy. Further, because the bounding function is implemented within the feedback loops of the amplifiers 54 and 70, the dependence on component tolerances or temperature coefficients, such as with the diode 72, is removed. As such, the maximum droop voltage $V_{DROOP}$, and corresponding minimum output voltage $V_{OUT}$ S limited with exceptionally good accuracy, assuming that the bounding voltage $V_{BOUND}$ is itself well controlled. Further, if $V_{BOUND}$ is set relative to $V_{DD}$, the same source for $I_{DROOP}$, $V_{BOUND}$ will move ratiometrically with changes in $I_{DROOP}$ arising from variations in $V_{DD}$. Therefore, $V_{DD}$ does not itself need to be generated with any exceptional precision.

The bounding voltage $V_{BOUND}$ may be generated internally to the controller 34 using any number of well-known techniques. For example, the controller 34 may incorporate a precision voltage reference 71, whose reference voltage is used to set $V_{BOUND}$. Alternatively, a precision voltage divider (not shown) may be used to generate $V_{BOUND}$ as a desired fraction of $V_{REF}$ or $V_{DD}$. The controller 34 may not include internal generation of $V_{BOUND}$, but may provide an external connection to receive $V_{BOUND}$ as generated by other circuitry. Note that as shown, $V_{BOUND}$ establishes a voltage offset relative to the supply voltage $V_{DD}$. Thus, changes in $V_{DD}$ that effect the voltages developed on the inputs of amplifier 54 have a like effect on the absolute value of $V_{BOUND}$, thus preserving the relative values between the voltages.

Of course, other techniques may be adopted as needed or desired, with all such variations being well understood by those skilled in the art. As a further variation, the controller 34 may include an external control input to set $V_{BOUND}$ based on an external signal. This would allow, for example, a system designer to set $V_{BOUND}$ using precisely matched resistors with temperature coefficients and initial tolerances selected in accordance with the needs of the particular design.

Figure 9:
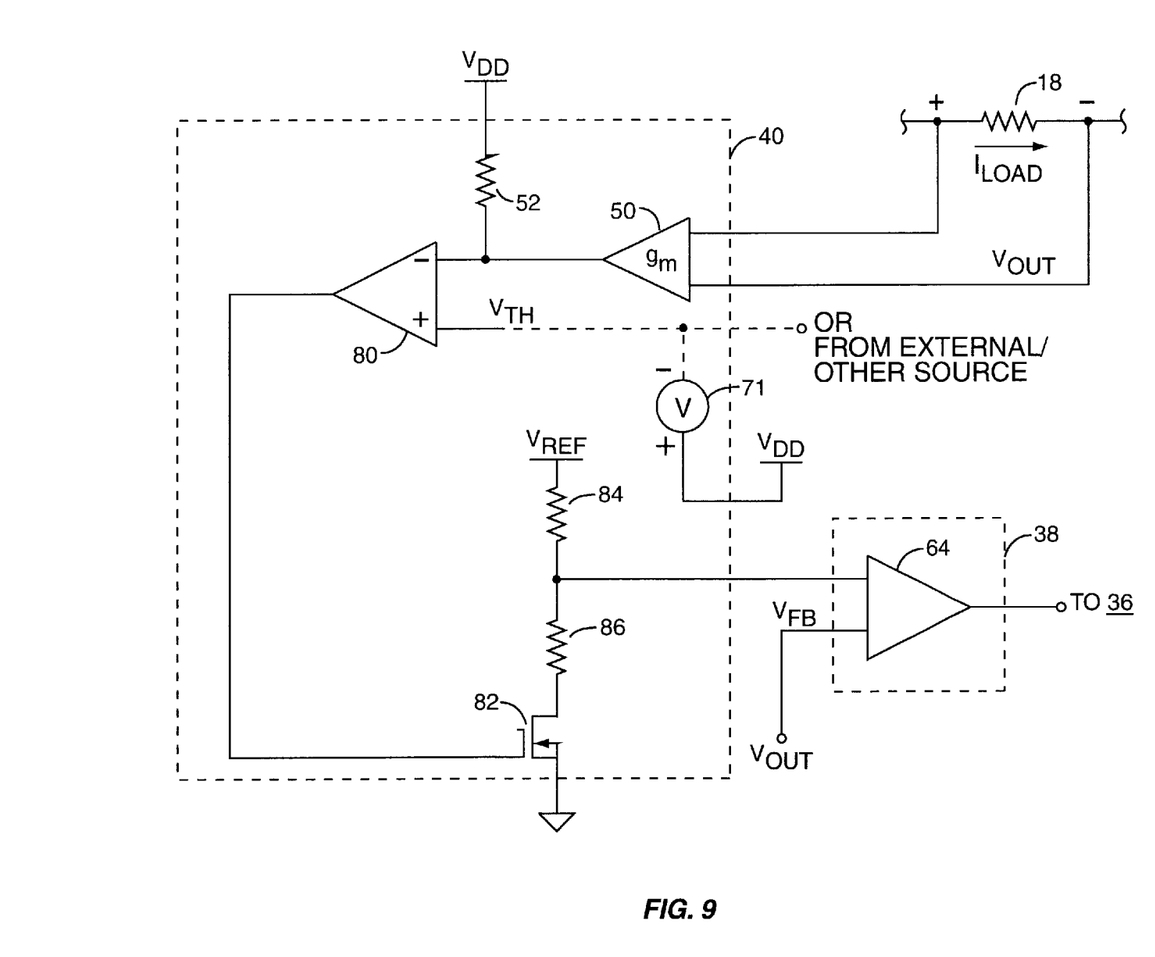
FIG. 9 is a diagram of an exemplary discrete bounded voltage droop circuit.

FIG. 9 is a diagram of an exemplary implementation of discrete bounded droop. The bounded droop circuit 40 comprises the transconductance amplifier 50 and its associated resistor 52, as well as a comparator 80, transistor switch 82, and resistive voltage divider formed by resistors 84 and 86. Preferably, the resistors 52, 84, and 86 are all external to the controller 34 so that the droop voltage characteristics can be set in accordance with the needs of a given design.

In operation, the regulation comparator 64 controls the switching circuit 36 to regulate $V_{OUT}$ substantially at the reference voltage $V_{REF}$. As the load current $I_{LOAD}$ increases, the voltage drop across the resistor 52 increases. Once the voltage at the inverting terminal (−) of the comparator 80 falls to the level of the droop threshold voltage $V_{TH}$, the comparator 80 asserts its output, turning on the switch 82. With the switch 82 on, the voltage divider formed by resistors 84 and 86 turns on, and the regulation comparator 64 sees a fraction of $V_{REF}$, rather than its full value. This has the net effect of causing the regulation comparator 64 to regulate $V_{OUT}$ to a value less than $V_{REF}$ based on the ratio of the voltage divider. Essentially, $V_{DROOP}$ equal the drop from $V_{REF}$ taken across the resistor 84. The comparison function can be implemented with hysteresis to insure stable operation for load currents just at the switching threshold of the comparator 80.

By implementing the resistors 84 and 86 as precision resistors with low temperature coefficients, the value of $V_{DROOP}$ may be established with exceptionally good accuracy. The threshold voltage $V_{TH}$, like the bounding voltage $V_{BOUND}$ discussed earlier, may be generated internally using a reference or source 71, or may be supplied via an external connection, and may be generated with essentially arbitrary precision.

The techniques discussed above may be applied to multi-phase power supplies where two or more output phases (e.g., switching circuits 42) are arranged in parallel and each provide a portion of the load current $I_{LOAD}$ to the load 14. When multiple output phases are used, the bounded droop circuit 40 may be modified to include a transconductance amplifier 50 for each one of the output phases, with each output phase including a sense resistor 18 for generating a differential voltage proportionate to load current. The outputs from all of the transconductance amplifiers 50 may be tied in common to the resistor 52, so that the portion in load current in any one of the output phases influences generation of the droop current $I_{DROOP}$.

Figure 10:
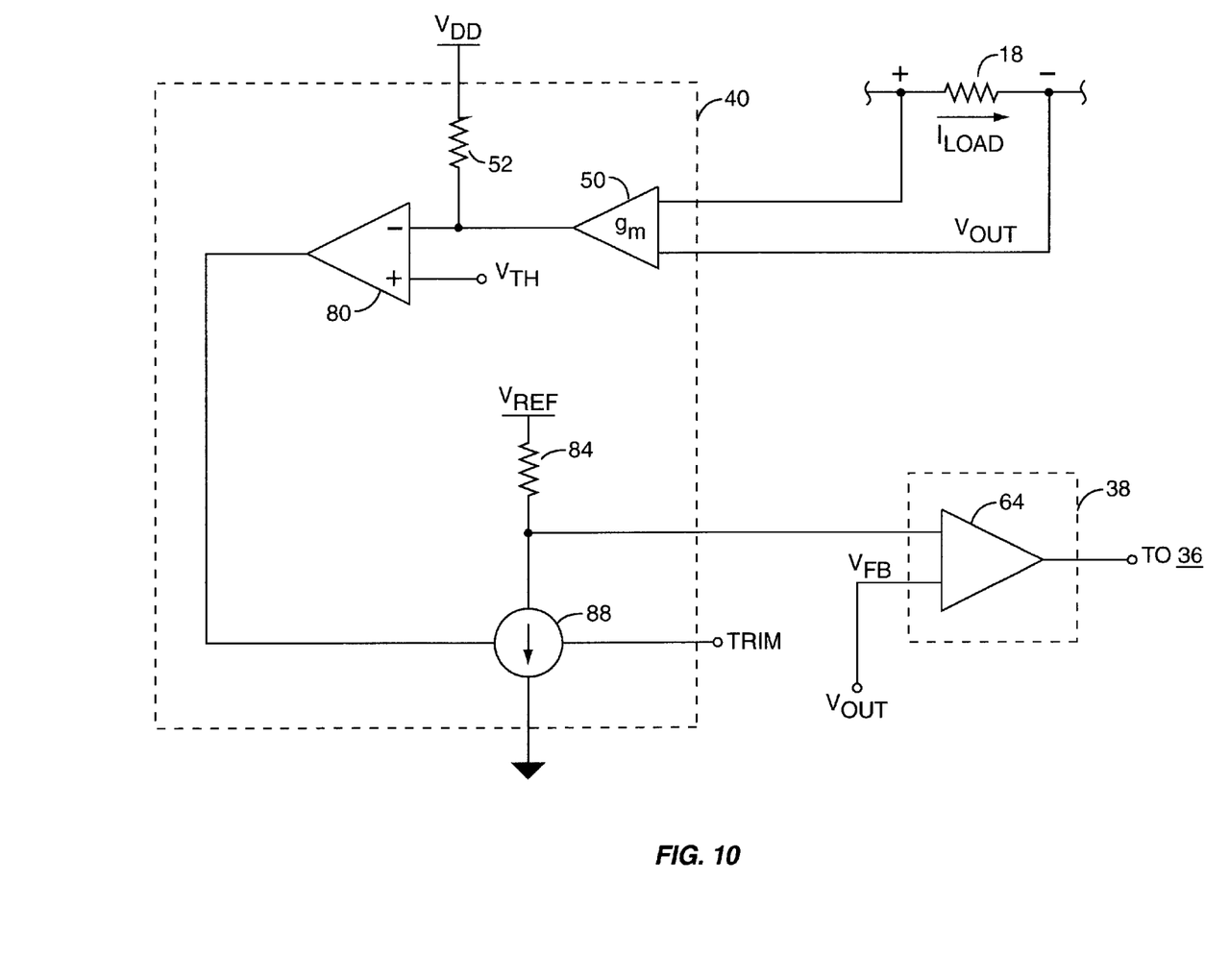
FIG. 10 is a diagram of another exemplary discrete bounded droop voltage circuit.

FIG. 10 illustrates a variation on the discrete bounded droop implementation of FIG. 9. In FIG. 10, a current source 88 is controlled by the output from the comparator 80. When the load current $I_{LOAD}$ is below the drooping threshold, the comparator 80 holds the current source 88 off. As the load current $I_{LOAD}$ increases, the droop current $I_{DROOP}$ increases proportionately, eventually causing the voltage on the non-inverting input of the comparator 80 to fall below the threshold voltage $V_{TH}$. At that point, the current source 88 turns on, and drops the reference voltage $V_{REF}$ by the desired amount.

Note that the current source 88 may be trimmed, thus allowing the resultant droop voltage on $V_{OUT}$ to be set according to specific design needs. The resistor 84 across which the droop voltage is developed may be an external value selectable according to specific design needs.

Figure 11:
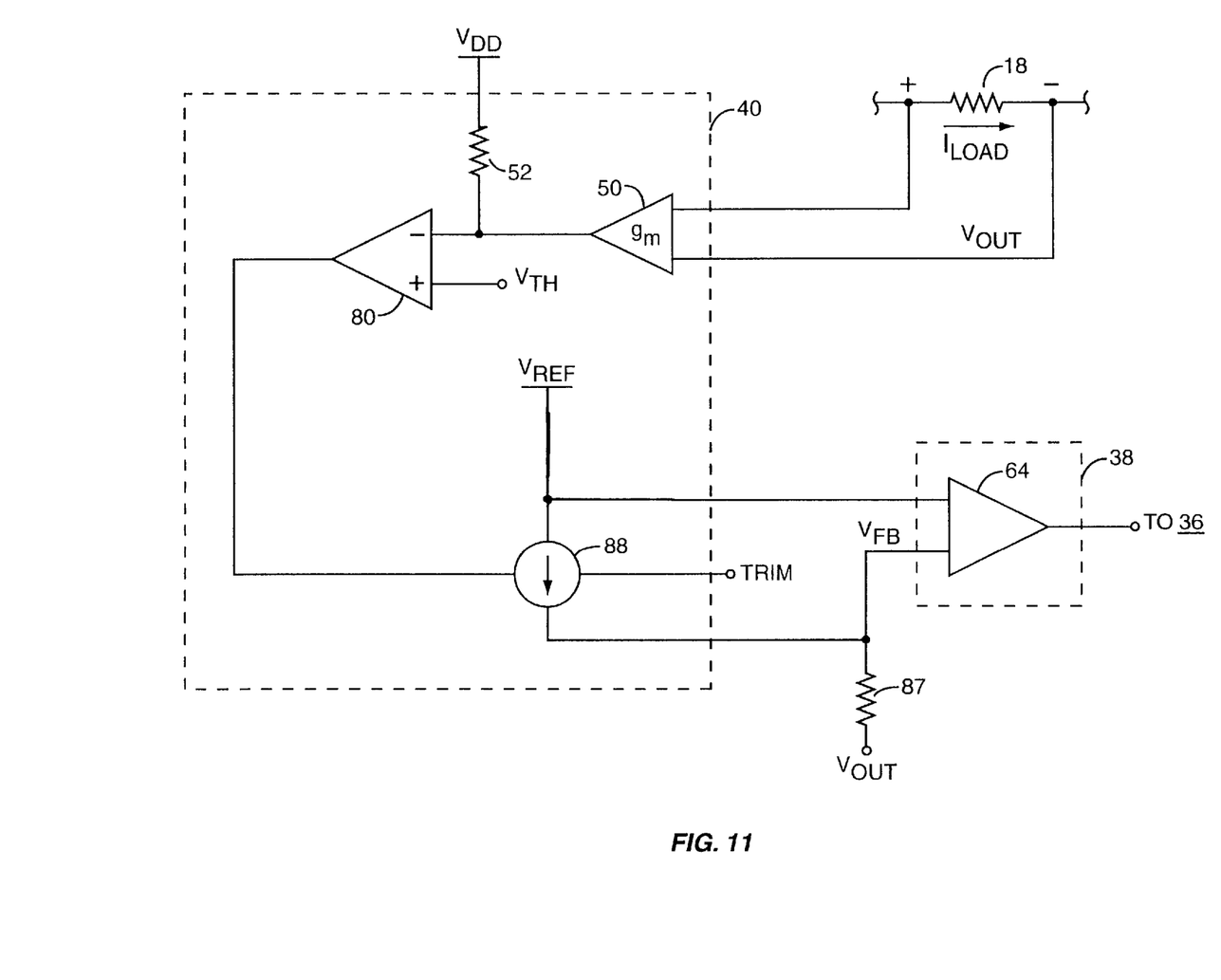
FIG. 11 is a diagram of another exemplary discrete bounded droop voltage circuit.

FIG. 11 presents a variation on the discrete drooping operation of FIG. 10. Rather than using the switchable current source 88 to droop the reference voltage $V_{REF}$, current is selectively sourced under control of the comparator 80 into the feedback voltage node. That is, the current source 88 sources current through the resistor 87 into $V_{OUT}$ when it is enabled. This action raises the feedback voltage $V_{FB}$, causing a commensurate droop in the output voltage $V_{OUT}$.

As should be understood from the above discussion, the present invention allows accurate, bounded droop control of the output voltage $V_{OUT}$. Drooping may be made linear or discrete, or a combined linear plus discrete approach may be used. In this latter combination, the linear techniques of, for example, FIG. 8, may be combined with the discrete techniques of, for example, FIGS. 10 or 11. In operation, the bounded droop circuit 40 would operate with linear drooping up to some desired threshold of load current $I_{LOAD}$, and then it would implement a discrete step in droop voltage, dropping $V_{OUT}$ to its bounded, lower value.

The present invention may, of course, be carried out in other specific ways than those herein set forth with departing from the scope and essential characteristics of the invention. The present embodiments are therefore to be construed in all aspects as illustrative and not restrictive, and all changes coming within the meaning and equivalency of the appended claims are intended to be embraced herein.

What is claimed is:

1. A bounded droop voltage circuit for use with a power supply providing a regulated output voltage signal to a load, said droop voltage circuit comprising:
   a first circuit to generate a droop current signal proportional to a load current drawn from said regulated output voltage signal; and
   a second circuit to generate a droop voltage signal based on said droop current signal to cause the power supply to reduce said regulated output voltage signal by an amount corresponding to said droop voltage signal, said second circuit including a limiting circuit to bound said droop voltage signal to a maximum value independent of the load current.

2. The bounded droop voltage circuit of claim 1 wherein said second circuit comprises a resistive circuit coupled at a first end to said first circuit to receive said droop current signal and coupled at a second end to said regulated output voltage signal, such that a regulation feedback voltage signal at said first end of said resistive circuit is the sum of said droop voltage signal which is developed across said resistive circuit and said regulated output signal.

3. The bounded droop voltage circuit of claim 2 wherein said limiting circuit comprises a current limiting circuit to fix a maximum value for said droop current signal based on a bounding voltage signal provided to said current limiting circuit.

4. The bounded droop voltage circuit of claim 2 wherein said limiting circuit comprises a voltage clamping circuit to fix a maximum value for said droop voltage signal developed across said resistive circuit.

5. The bounded droop voltage circuit of claim 4 wherein said voltage clamping circuit comprises a clamping diode coupled in parallel with said resistive circuit.

6. The bounded droop voltage circuit of claim 1 wherein said first circuit comprises a current source to generate said droop current signal in proportion to the load current.

7. The bounded droop voltage circuit of claim 6 wherein said current source comprises:
   a transconductance amplifier to generate a reference current signal proportional to a differential input voltage signal that is dependent upon the load current; and
   an operational amplifier circuit to generate said droop current signal proportional to said reference current signal.

8. The bounded droop voltage circuit of claim 7 wherein said current source further comprises gain setting resistors to set a current gain for said droop current signal relative to said reference current signal.

9. The bounded droop voltage circuit of claim 8 wherein at least one of said gain setting resistors comprises a user-selectable resistor element to permit setting said current gain as desired.

10. The bounded droop voltage circuit of claim 7 wherein said operational amplifier circuit comprises:
    an operational amplifier with a first input terminal coupled to a first voltage signal determined by said reference current signal and a second input terminal coupled to a second voltage signal determined by said droop current signal; and
    a pass transistor in a feedback loop of said operational amplifier to control said droop current signal responsive to an output signal of said operational amplifier such that a difference between said first and second voltage signals is minimized.

11. The bounded droop voltage circuit of claim 10 wherein said limiting circuit comprises a bounding circuit to override control of said pass transistor by said operational amplifier when said second voltage signal reaches the value of a bounding voltage signal.

12. The bounded droop voltage circuit of claim 11 wherein said bounding circuit comprises an amplifier to retard the on-bias of said pass transistor independent of biasing control from said operational amplifier such that said droop current signal is constrained to a maximum current value based on the value of said bounding voltage signal and irrespective of continued increases in said reference current signal stemming from increases in the load current.

13. The bounded droop voltage circuit of claim 11 further comprising a voltage reference to generate said bounding voltage signal.

14. The bounded droop voltage circuit of claim 11 wherein said bounding voltage signal is derived from a supply voltage signal that also determines the absolute value of said second voltage signal such that the value of said bounding voltage signal moves in proportion to changes in said second voltage signal arising from changes in the supply voltage signal.

15. The bounded droop voltage circuit of claim 1 wherein said first circuit comprises:
- a transconductance amplifier to generate said droop current signal in proportion to a differential voltage signal developed as a function of the load current; and
- a resistor through which said droop current signal is sourced to generate a first voltage signal determined by the voltage drop across said resistor arising from said reference current.

16. The bounded droop voltage circuit of claim 15 wherein said second circuit comprises:
- a comparator to generate a control signal based on comparing said first voltage signal with a threshold voltage signal;
- a voltage divider circuit to provide the full value of a regulation voltage reference signal to a regulation control circuit of the power supply in a first mode, and to provide a determined fraction of the regulation voltage reference signal in a second mode, said voltage divider circuit thus acting as said limiting circuit;
- a switch coupled to a terminal end of said voltage divider circuit to set said voltage divider circuit in one of said first and second modes responsive to said control signal from said comparator circuit;
- said determined fraction of said regulation reference voltage signal establishing the amount of output voltage droop allowed by said bounded droop voltage circuit when said first voltage signal falls below said threshold voltage signal.

17. The bounded droop voltage circuit of claim 15 wherein said second circuit comprises:
- a comparator to generate a control signal based on comparing said first voltage signal with a threshold voltage signal;
- a resistor coupled at a first end to a regulation voltage reference signal, and coupled at a second end to a regulation control circuit input of the power supply;
- a switched current source responsive to said control signal from said comparator to reduce the value of the regulation control voltage reference signal provided to the regulation control circuit of the power supply by an amount determined by the value of said resistor and the magnitude of the current signal generated by said current source when said first voltage signal falls below said threshold voltage signal.

18. The bounded droop voltage circuit of claim 17 wherein said switched current source comprises a trimmable current source responsive to a trim signal to set a desired value of said current signal, thereby establishing the amount of voltage droop applied to said regulated output voltage signal by said power supply when said first voltage signal falls below said threshold voltage signal.

19. A power supply circuit comprising:
- a control circuit to regulate an output voltage signal provided to a load powered by said power supply circuit at a first voltage level based on the relative values of a feedback signal derived from the output voltage signal and a reference signal corresponding to the first voltage level; and
- a bounded droop voltage circuit to droop the output voltage signal by an amount determined by a droop voltage signal generated by said bounded droop voltage circuit based on a load current provided to said load, said bounded droop voltage circuit comprising:
  - a first circuit to generate a droop current signal proportional to the load current; and
  - a second circuit to generate said droop voltage signal based on said droop current signal to cause the power supply circuit to reduce said output voltage signal by an amount corresponding to said droop voltage signal, said second circuit including a limiting circuit to bound said droop voltage signal to a maximum value independent of the load current.

20. The power supply circuit of claim 19 wherein said second circuit comprises a resistive circuit coupled at a first end to said first circuit to receive said droop current signal and coupled at a second end to said regulated output voltage signal, such that a regulation feedback voltage signal at said first end of said resistive circuit is the sum of said droop voltage signal which is developed across said resistive circuit and said regulated output signal.

21. The power supply circuit of claim 20 wherein said limiting circuit comprises a current limiting circuit to fix a maximum value for said droop current signal based on a bounding voltage signal provided to said current limiting circuit.

22. The power supply circuit of claim 20 wherein said limiting circuit comprises a voltage clamping circuit to fix a maximum value for said droop voltage signal developed across said resistive circuit.

23. The power supply circuit of claim 22 wherein said voltage clamping circuit comprises a clamping diode coupled in parallel with said resistive circuit.

24. The power supply circuit of claim 19 wherein said first circuit comprises a current source to generate said droop current signal in proportion to the load current.

25. The power supply circuit of claim 24 wherein said current source comprises:
- a transconductance amplifier to generate a reference current signal proportional to a differential input voltage signal that is dependent upon the load current; and
- an operational amplifier circuit to generate said droop current signal proportional to said reference current signal.

26. The power supply circuit of claim 25 wherein said current source further comprises gain setting resistors to set a current gain for said droop current signal relative to said reference current signal.

27. The power supply circuit of claim 26 wherein at least one of said gain setting resistors comprises a user-selectable resistor element to permit setting said current gain as desired.

28. The power supply circuit of claim 25 wherein said operational amplifier circuit comprises:
- an operational amplifier with a first input terminal coupled to a first voltage signal determined by said reference current signal and a second input terminal coupled to a second voltage signal determined by said droop current signal; and
- a pass transistor in a feedback loop of said operational amplifier to control said droop current signal responsive to an output signal of said operational amplifier such that a difference between said first and second voltage signals is minimized.

29. The power supply circuit of claim 28 wherein said limiting circuit comprises a bounding circuit to override control of said pass transistor by said operational amplifier when said second voltage signal reaches the value of a bounding voltage signal.

30. The power supply circuit of claim 29 wherein said bounding circuit comprises an amplifier to retard the on-bias of said pass transistor independent of biasing control from said operational amplifier such that said droop current signal is constrained to a maximum current value based on the value of said bounding voltage signal and irrespective of continued increases in said reference current signal stemming from increases in the load current.

31. The power supply circuit of claim 29 further comprising a voltage reference to generate said bounding voltage signal.

32. The power supply circuit of claim 29 wherein said bounding voltage signal is derived from a supply voltage signal that also determines the absolute value of said second voltage signal such that the value of said bounding voltage signal moves in proportion to changes in said second voltage signal arising from changes in the supply voltage signal.

33. The power supply circuit of claim 19 wherein said first circuit comprises:
a transconductance amplifier to generate said droop current signal in proportion to a differential voltage signal developed as a function of the load current; and
a resistor through which said droop current signal is sourced to generate a first voltage signal determined by the voltage drop across said resistor arising from said reference current.

34. The power supply circuit of claim 33 wherein said second circuit comprises:
a comparator to generate a control signal based on comparing said first voltage signal with a threshold voltage signal;
a voltage divider circuit to provide the full value of a regulation voltage reference signal to a regulation control circuit of the power supply in a first mode, and to provide a determined fraction of the regulation voltage reference signal in a second mode, said voltage divider circuit thus acting as said limiting circuit;
a switch coupled to a terminal end of said voltage divider circuit to set said voltage divider circuit in one of said first and second modes responsive to said control signal from said comparator circuit;
said determined fraction of said regulation reference voltage signal establishing the amount of output voltage droop allowed by said bounded droop voltage circuit when said first voltage signal falls below said threshold voltage signal.

35. The power supply circuit of claim 33 wherein said second circuit comprises:
a comparator to generate a control signal based on comparing said first voltage signal with a threshold voltage signal;
a resistor coupled at a first end to a regulation voltage reference signal, and coupled at a second end to a regulation control circuit input of the power supply;
a switched current source responsive to said control signal from said comparator to reduce the value of the regulation control voltage reference signal provided to the regulation control circuit of the power supply by an amount determined by the value of said resistor and the magnitude of the current signal generated by said current source when said first voltage signal falls below said threshold voltage signal, said switched current source thus acting as said limiting circuit.

36. The bounded voltage droop circuit of claim 35 wherein said switched current source comprises a trimmable current source responsive to a trim signal to set a desired value of said current signal, thereby establishing the amount of voltage droop applied to said regulated output voltage signal by said power supply when said first voltage signal falls below said threshold voltage signal.

37. A method o providing voltage droop in a regulated output voltage provided by a power supply while maintaining a lower bound on said regulated output voltage, the method comprising:
generating a droop current proportional to a load current;
generating a droop voltage based on said droop current to adjust said regulated output voltage provided to a load; and
bounding said droop voltage to a maximum value to establish an accurate lower bound for said regulated output voltage.

38. The method of claim 37 wherein generating a droop voltage based on said droop current comprises passing said droop current through a droop resistor coupled in series to said regulated output voltage to generate an output feedback signal that is offset above said regulated output voltage by the value of said droop voltage.

39. The method of claim 38 wherein clamping said droop voltage to a maximum magnitude irrespective of further increases in the load current to establish a well defined lower bound for said regulated output voltage comprises placing a voltage clamp across said droop resistor, said voltage clamp configured to limit said droop voltage to a desired maximum value.

40. The method of claim 37 wherein clamping said droop voltage to a maximum magnitude irrespective of further increases in the load current to establish a well defined lower bound for said regulated output voltage comprises limiting a current source providing said droop current to a maximum output current magnitude irrespective of any further increases in said load current.

41. The method of claim 40 wherein said current source comprises a variably biased pass transistor sourcing said droop current from a supply voltage, the method further comprising:
generating a bias voltage for said pass transistor proportionate to said load current; and
limiting said bias voltage to a maximum value corresponding to a maximum desired droop voltage irrespective of further increases in said load current.

42. The method of claim 37 wherein adjusting the relative values of a feedback signal associated with said regulated output voltage and a reference signal corresponding to an initial value desired for said regulated output signal based on said droop voltage comprises:
feeding back said regulated output voltage as a first signal; and
adding said droop voltage to said first signal to generate said feedback signal.

43. The method of claim 42 further comprising regulating said regulated output voltage based on comparing said reference signal to said feedback signal, said reference signal corresponding to the desired initial value for said regulated output voltage absent any droop voltage compensation.

* * * * *